United States Patent
Ramani et al.

(10) Patent No.: US 7,120,618 B2
(45) Date of Patent: Oct. 10, 2006

(54) SYSTEM AND METHOD FOR DEFINING AND USING SUBCLASSES DECLARATIVELY WITHIN MARKUP

(75) Inventors: Sundaram Ramani, Redmond, WA (US); Robert A. Relyea, Redmond, WA (US); Jeffrey L. Bogdan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

(21) Appl. No.: 10/377,313

(22) Filed: Feb. 28, 2003

(65) Prior Publication Data

US 2004/0172617 A1 Sep. 2, 2004

(51) Int. Cl.
*G06F 17/00* (2006.01)
*G06N 5/00* (2006.01)

(52) U.S. Cl. .............................. 706/45; 706/14; 706/46

(58) Field of Classification Search ................ 715/513; 706/45, 14, 46
See application file for complete search history.

(56) References Cited

U.S. PATENT DOCUMENTS

| | | | |
|---|---|---|---|
| 6,342,907 B1 | 1/2002 | Petty et al. .................. 345/762 |
| 6,941,510 B1* | 9/2005 | Ozzie et al. ................. 715/513 |
| 6,957,394 B1* | 10/2005 | Fernandez et al. .......... 715/760 |
| 2002/0091818 A1* | 7/2002 | Cascio et al. ............... 709/224 |
| 2003/0149934 A1* | 8/2003 | Worden ....................... 715/513 |
| 2004/0064825 A1* | 4/2004 | Lim et al. ................... 719/319 |
| 2004/0064826 A1* | 4/2004 | Lim et al. ................... 719/319 |

OTHER PUBLICATIONS

Jue, Xia et al., "Design and Implementation of a SMIL Player", Proceedings of the SPIE—The International Society for Optical Engineering, vol. 3648, 1998, pp. 382-389.

* cited by examiner

*Primary Examiner*—Joseph P. Hirl
(74) *Attorney, Agent, or Firm*—Merchant & Gould P.C.

(57) ABSTRACT

Described is a system, method, and data structure that enables an executable assembly associated with a subclass to be generated from a subclass definition within a markup document. In accordance with the invention, the subclass definition is written based on a schema. The schema may be XML-based. The schema includes a subclass tag for defining a name for the subclass. The name is associated with a type for an object that is instantiated when the executable assembly executes. The schema further includes one or more hints, such as for specifying a programming language to compile the subclass definition, for specifying a superclass from which the subclass derives, for specifying actions to perform when the object becomes instantiated, for creating an event definition and event handler for the subclass, and for specifying a property that becomes a member within the object when the object is instantiated.

39 Claims, 10 Drawing Sheets

```
< Button xmlns:"using:Controls.System.Controls"

xmlns:def="Definition"

def:Language="C#"

def:Class="MyControlLib.MyButton">

<Image ID="img1" DataLoaded="OnLoaded" Source = "HappyFace.jpg" />

<def:Code><![CDATA[
    function OnLoaded(Element target, DataLoadedEventArgs args)
    {
        string src = img1.Source;
    } function int CustomInit()
    {
        // insert any code here
    }

]]></def:Code>

<def:Constructor><![CDATA[

CustomInit();

]]></def:Constructor>

</Button>
```

*Fig. 5*

```
<Button xmlns:"using:Controls.System.Controls"
    xmlns:def="Definition"
    def:Language="C#"
    def:Class="MyControlLib.MyButton">
    <Image ID="img1" DataLoaded="OnLoaded" Source = "HappyFace.jpg" />
    <def:Code><![CDATA[
    public delegate void DblClickEventHdlr(Element target, ClickEvtArgs args);
    function OnLoaded(Element target, DataLoadedEventArgs args)
    {
        string src = img1.Source;
    } function int CustomInit()
    {
        // insert any code here
    }
    ]]></def:Code>
    <def:Constructor><![CDATA[
        CustomInit();
    ]]></def:Constructor>
    <def:Property Name="Label" Type="String" DefaultValue="null"
        Flags="Inherit |ReadOnly | Sheet"/>
    <def:Event Name="DblClick" Route="DirectAndBubble" Flags="Sync" />
</Button>
```

- 600 (code block)
- 632 → `<def:Code><![CDATA[`
- 630 → `public delegate void DblClickEventHdlr(...)`
- 610 → `<def:Property ...>`
  - 612: Name="Label"
  - 614: Type="String"
  - 616: DefaultValue="null"
  - 618: Flags="Inherit |ReadOnly | Sheet"
- 620 → `<def:Event ...>`
  - 622: Name="DblClick"
  - 624: Route="DirectAndBubble"
  - 626: Flags="Sync"

*Fig. 6*

```
702 ─── <FlowPanel ID="root" Background="White"
704 ───      xmlns="using:System.Controls"
706 ───      xmlns:ctl="using:MyControlLib">
708 ───      <ctl:MyButton ctl:ID="button1">ClickMe!</ctl:MyButton>
        </FlowPanel>
```

```
1   namespace MyControlLib {
2     using System.Controls;
3     using System;
4
5     public class MyButton : System.Controls.Button {
6
7       private System.Controls.Image img1;
8
9       public static System.DynamicProperty LabelProperty =
10        System.ComponentModel.Properties.PropertyManager.RegisterProperty(
11          "Label", ((PropertyFlags.Inherit | PropertyFlags.ReadOnly) | PropertyFlags.Sheet),
12          typeof(String), null, typeof(MyButton), null, typeof(MyButton), 0);
13
14      public static System.DynamicEvent DblClickEvent =
15        System.EventManager.RegisterEvent("DblClick", EventRoute.DirectAndBubble,
16        EventFlags.Sync, typeof(DblClickEventHandler), typeof(MyButton));
17
18      function OnLoaded(Element target, DataLoadedEventArgs args)
19        {   string src = img1.Source;          }
20
21      function int CustomInit()              { }
22
23      public MyButton(System.Windows.Element parent) : base(parent)
24        {   this.__Initialize_This();          }
25
26      public MyButton() : this(null)          { }
27
28      public String Label {
29          get { return ((String)(this.GetValue(MyButton.LabelProperty)));     }
30      }
31
32      private void __Initialize_This() {
33        CustomInit();
34        System.Controls.Button _Button_1_ = this;
35        System.Controls.Image _Image_2_ = new System.Controls.Image();
36        this.img1 = _Image_2_;
37        _Image_2_.SetValue(System.Element.IDProperty, "img1");
38        _Image_2_.AddHandler(System.Controls.Image.DataLoadedEvent, new
39                   System.Controls.DataLoadedEventHandler(this.OnLoaded),
40                   EventStage.Bubble, EventHandled.Unhandled, true);
41        _Image_2_.SetValue(System.Controls.Image.SourceProperty, "HappyFace.jpg");
42        _Button_1_.Elements.InsertBefore(null, _Image_2_);
43      }
44   } }
```

*Fig. 10*

SYSTEM AND METHOD FOR DEFINING AND USING SUBCLASSES DECLARATIVELY WITHIN MARKUP

BACKGROUND OF THE INVENTION

Today, software development tools allow software developers the ability to build executable components using one or more programming languages, such as C, C++, C#, and the like. One advantage for building executable components is that the components, once built, may be re-used by other software programs. Another advantage for building executable components is that new components may be easily extended from existing components.

Generally, components are extended by subclassing, which means deriving a new class from an existing class. These classes and subclasses are written using one of the programming languages. The code that is written is commonly referred to as source code. For traditional runtime environments, the software development tools compile the source code into object code and then link multiple object codes together to create an executable. However, one of the problems with these traditional runtime environments is that each programming language and each version of the programming language require a different runtime environment.

To overcome this problem, a new type of runtime environment has been designed that effectively eliminates many of the cross-language interface and language version problems of the traditional runtime environments. In this new type of runtime environment, development tools compile the source code into an intermediate language. During runtime, the runtime environment compiles the intermediate language into native binary executable code. Thus, the new runtime environment performs the "linking-type" process during runtime. In order to perform this "linking-type" process, the runtime environment reads information (e.g., metadata) and accesses IL assemblies for the components associated with the program that is being run. The metadata includes descriptions for types, versions, resources, and the like. The IL assemblies may be a single dynamic link library (DLL), or numerous DLLs and resources.

For both the traditional and the new type of runtime environment, the source code is written using a programming language. Each programming language has its own unique syntax and set of application programming interfaces (API) specific to the runtime environment. In order for a software developer to write source code, the developer must learn the syntax of the programming language and the APIs associated with the runtime environment. Learning the syntax and APIs is very time consuming and challenging. In addition, if a developer wishes to program using multiple programming languages and/or different runtime environments, the developer must remember the similarities and the subtle differences between each of the programming language's syntax and the APIs for the various runtime environments.

Given the advantages of using components, there is a need for a better mechanism for building, extending, and using components.

SUMMARY OF THE INVENTION

The present invention is directed at a system and method for defining, extending, and using subclasses declaratively within markup. The invention provides a mechanism for developers to build, extend, and use components using a markup language. These components include reusable components, application user interfaces, document user interfaces, and the like. The mechanism does not require a developer to know a programming language. Instead, the mechanism allows the developer to use a familiar markup language, such as XML (extensible markup language), to build components. Because XML is much easier to learn and is becoming more familiar within the general computer programming community, the present invention offers several advantages over using traditional programming languages. One advantages is that components may be defined within a markup document, along with other markup text, to create a very sophisticated electronic document. Another advantage is that developers do not need to know or understand any programming language in order to generate an executable component.

The system, method, and data structure of the present invention enable an executable assembly associated with a subclass to be generated from a subclass definition written within a markup document. In accordance with the invention, the subclass definition is written based on a schema. The schema may be XML-based. The schema includes a subclass tag for defining a name for the subclass. The name is associated with a type for an object that is instantiated when the executable assembly executes. The schema further includes one or more hints, such as for specifying a programming language to compile the subclass definition, for specifying a superclass from which the subclass derives, for specifying actions to perform when the object becomes instantiated, for creating an Event definition and associated EventHandler for the subclass, and for specifying a property that becomes a field within the object when the object is instantiated.

DETAILED DESCRIPTION OF THE PREFERRED EMBODIMENT

The present invention is directed at a system and method for defining, extending, and using subclasses declaratively within a markup document. The invention provides a mechanism for developers to build, extend, and use components using a markup language. The mechanism does not require a developer to know a programming language. Instead, the mechanism allows the developer to use a familiar markup language, such as the extensible markup language (XML), to create components.

Illustrative Computing Environment

Figure 1:
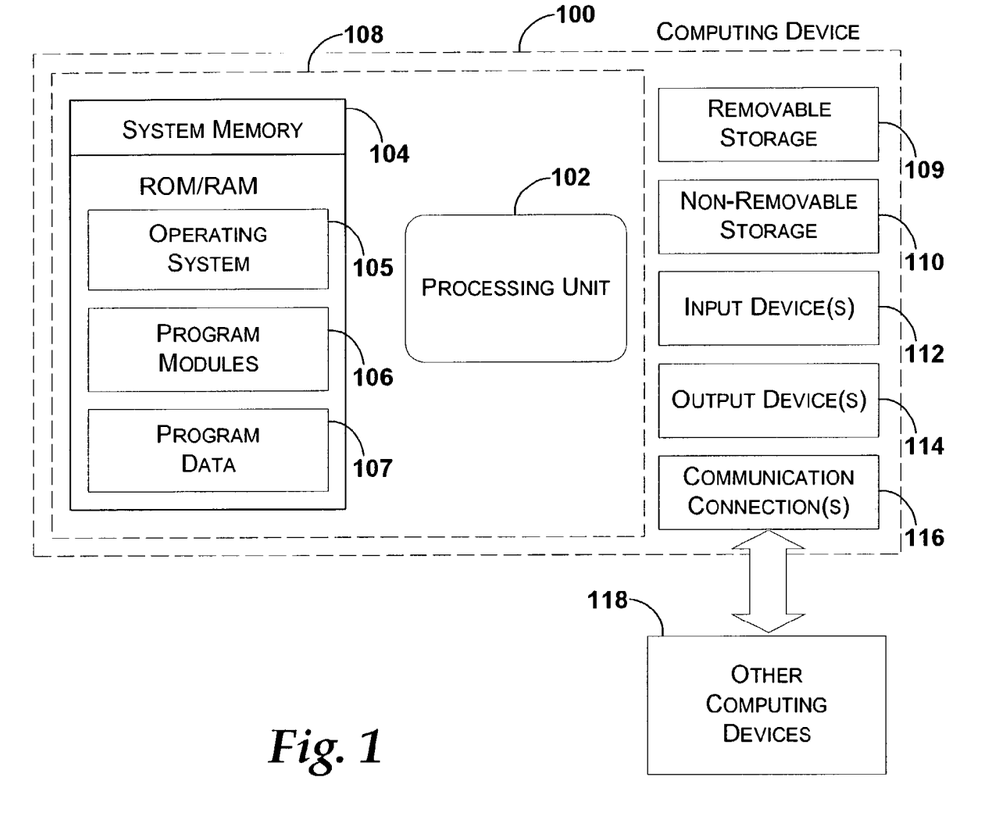
FIG. 1 illustrates an exemplary computing device that may be used in illustrative implementations of the present invention.

FIG. 1 illustrates an exemplary computing device that may be used in illustrative implementations of the present invention. With reference to FIG. 1, in a very basic configuration, computing device 100 typically includes at least one processing unit 102 and system memory 104. Depending on the exact configuration and type of computing device 100, system memory 104 may be volatile (such as RAM), non-volatile (such as ROM, flash memory, etc.) or some combination of the two. System memory 104 typically includes an operating system 105, one or more program modules 106, and may include program data 107. Examples of program modules 106 include a browser application, a finance management application, a word processor, and the like. This basic configuration is illustrated in FIG. 1 by those components within dashed line 108

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. These devices are well know in the art and need not be discussed at length here.

Computing device 100 may also contain communication connections 116 that allow the device 100 to communicate with other computing devices 118, such as over a network. Communication connections 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Illustrative Implementation

Figure 2:
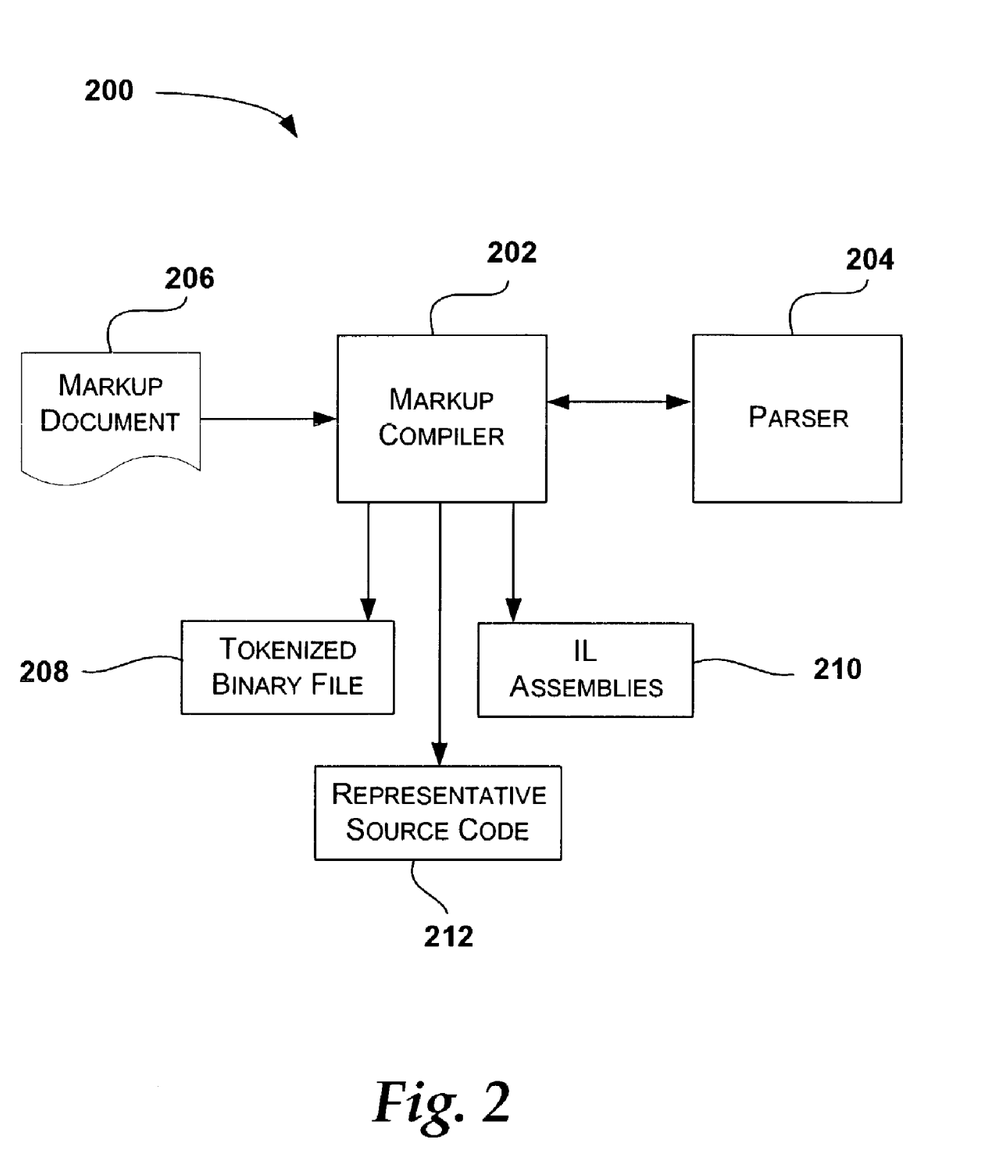
FIG. 2 is a functional block diagram generally illustrating components for implementing one embodiment of the present invention.

FIG. 2 is a functional block diagram generally illustrating a development system for implementing one embodiment of the present invention. The system includes a markup compiler 202 and a parser 204. The markup compiler 202 and parser 204 are software modules (i.e., program modules 106 shown in FIG. 1) that may reside on a computing device, such as computing device 100 shown in FIG. 1. The markup compiler 202 inputs a markup document 206. In one embodiment, the markup document 206 is an extensible markup language (XML) based document. Briefly, the markup document 206, illustrated in FIGS. 4-6 and described in detail below, includes tags (not shown) that indicate parts of a subclass definition. As will be described in detail later, the tags indicate the presence of a subclass and associated elements. Upon encountering these tags, the markup compiler 202 begins communicating with parser 204 in order to build the subclass.

In one embodiment, the functionality provided by parser 204 may be provided within markup compiler 202. In another embodiment, the functionality provided by parser 204 may be provided by deriving a parsing class from an existing parser class within the markup compiler 202. The derived parsing class may include function overrides for each of the subclass tokens (i.e., tags) defined in accordance with the present invention. Briefly, the function overrides, illustrated in FIG. 10 and described in detail later, may be part of a series of callback functions that signal a beginning and an ending for the definitions of the elements associated with the subclass.

Parser 204 is configured to parse subclass definitions within markup document 206. Briefly, the markup compiler 202 compiles content within the markup document 206. In one embodiment, the markup compiler 202 converts the content into a tokenized binary stream that is saved in a tokenized binary file 208. The tokenized binary file 208 may be one of several forms known to those skilled in the art. The tokenized binary file 208 represents a tree of components specified in the markup document 206. However, the markup compiler 202 may be unable to convert some of the content directly, this content may be sent to the parser 204. The subclass definitions defined within the markup document 206 in accordance with the present invention is an example of such content. Parser 204 identifies properties, events, and the like within the subclass definitions and relays pertinent information about these items to the markup compiler 202.

Upon receiving the pertinent information, markup compiler 202 adds tokens to the markup document 206 that are associated with the subclass definition. The markup compiler 202 may also generate representative source code 212 from which IL assemblies 210 are created. IL assemblies 210 include computer instructions for subclasses (e.g., components) defined within markup document 206. In the past, these IL assemblies were generated using a software development tool that compiled and linked source code written using a programmatic language. One skilled in the art will also appreciate that, in another embodiment, the markup compiler 202 may generate the IL assemblies 210 without generating the tokenized binary file 208.

Figure 7:
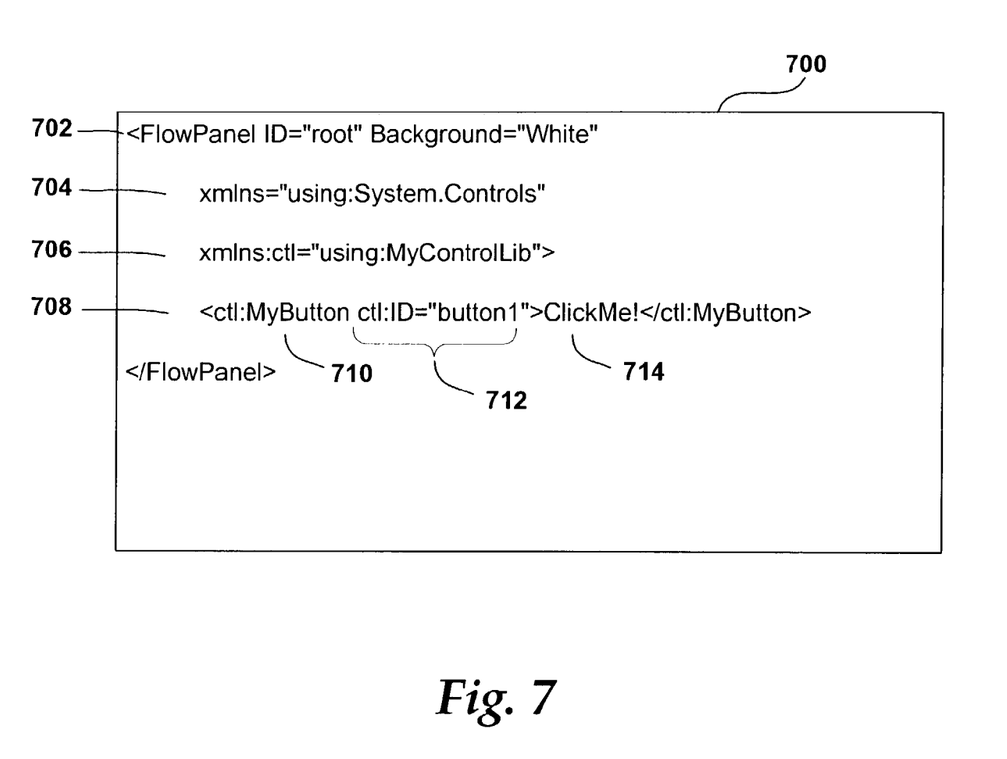
FIG. 7 illustrates salient portions of a markup document that illustrates an exemplary syntax for using an executable component from within a markup document.

IL assemblies 210 created by markup compiler 202 may be re-used by traditional programming development tools. In addition, the IL assemblies 210 may be re-used in other markup documents. The ability to re-use IL assemblies 210 within a markup document is illustrated in FIG. 7 and described in conjunction therein. Thus, the present invention allows component developers the ability to easily build and extend components using a markup language. Once new components have been built in accordance with the present invention, the new components appear as if built using a traditional programming language. Thus, developers using the mechanism and method of the present invention may build components without learning the syntax and nuances of one or more programming languages.

Figure 3:
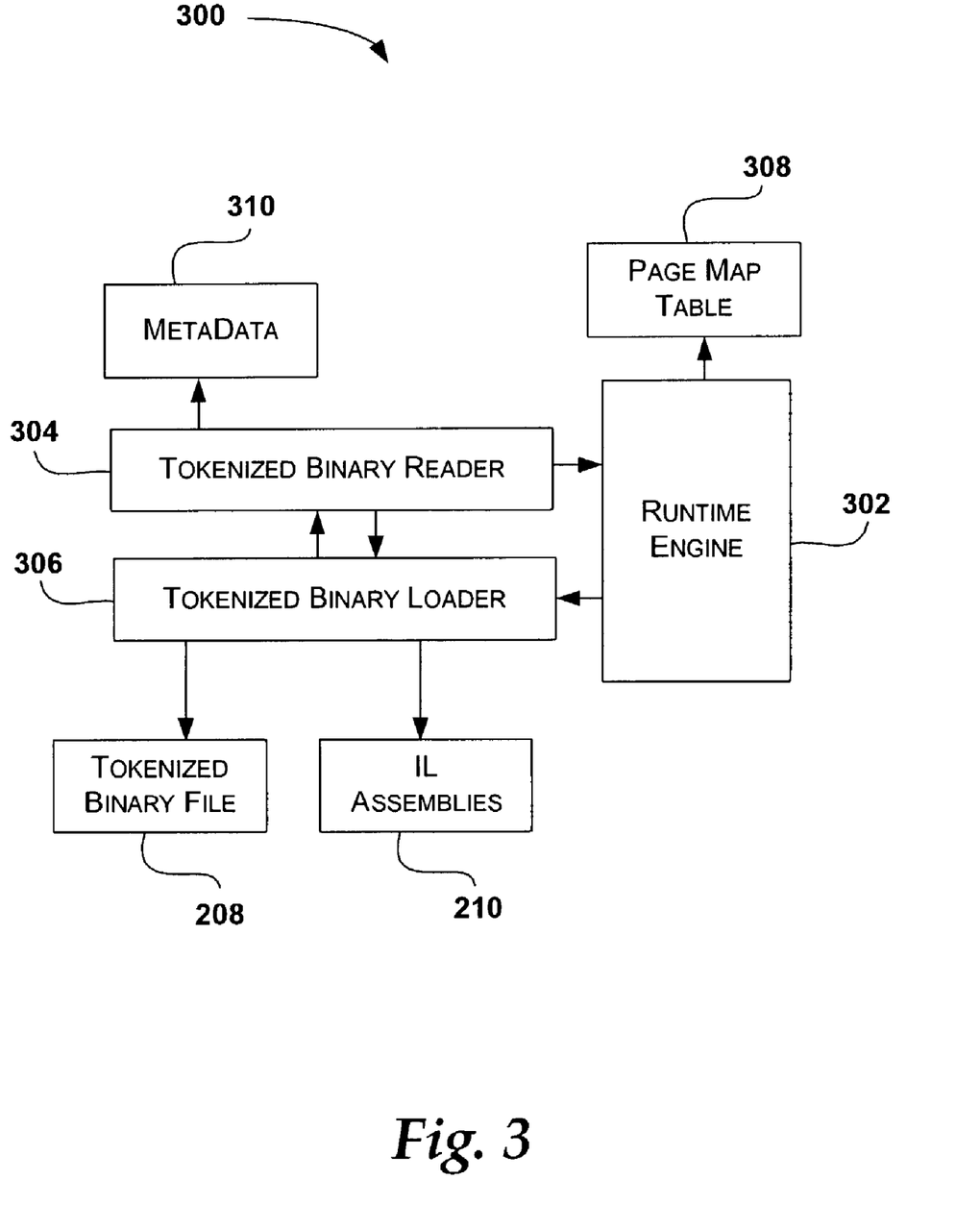
FIG. 3 is a functional block diagram generally illustrating a runtime environment for implementing one embodiment of the present invention.

FIG. 3 is a functional block diagram generally illustrating a runtime environment for implementing one embodiment of the present invention. The runtime environment includes a runtime engine 302, a tokenized binary reader 304, and a tokenized binary loader 306. When the runtime engine 302 receives a request for loading a particular resource (e.g., markup document 206 shown in FIG. 2), the runtime engine 302 accesses a page map table 308. The page map table 308 identifies whether or not the markup document 206 has a compiled version (e.g., tokenized binary file 208). If a compiled version exists, the runtime engine 302 communicates with the tokenized binary loader 306 to load the tokenized binary file 208. In one embodiment, the tokenized binary file 208 identifies IL assemblies (e.g., IL assembly 210) associated with the tokenized binary file 208. The tokenized binary loader 306 then loads the identified IL assemblies 210. Once a portion or the entire tokenized binary file 208 and the associated IL assemblies 210 have been loaded, the tokenized binary reader 304 begins reading the tokenized binary file 208 and the IL assembly 210 to generate native instructions that are executed on a processor (e.g., processing unit 102 shown in FIG. 1). The tokenized binary reader 304 may access metadata 310 to determine information, such as types, methods, and events. In general, metadata 310 includes information about methods, fields, properties, and events. Each of these items may have its own metadata that can be read for additional details. Thus, using metadata 310, the tokenized binary reader 304 uses reflection during runtime to programmatically determine information about the elements within the tokenized binary file 208. In addition, as will be described in detail later, subclasses originally defined in the markup document 206 may be directly executed using the IL assemblies 210 created in accordance with the present invention.

Figure 4:
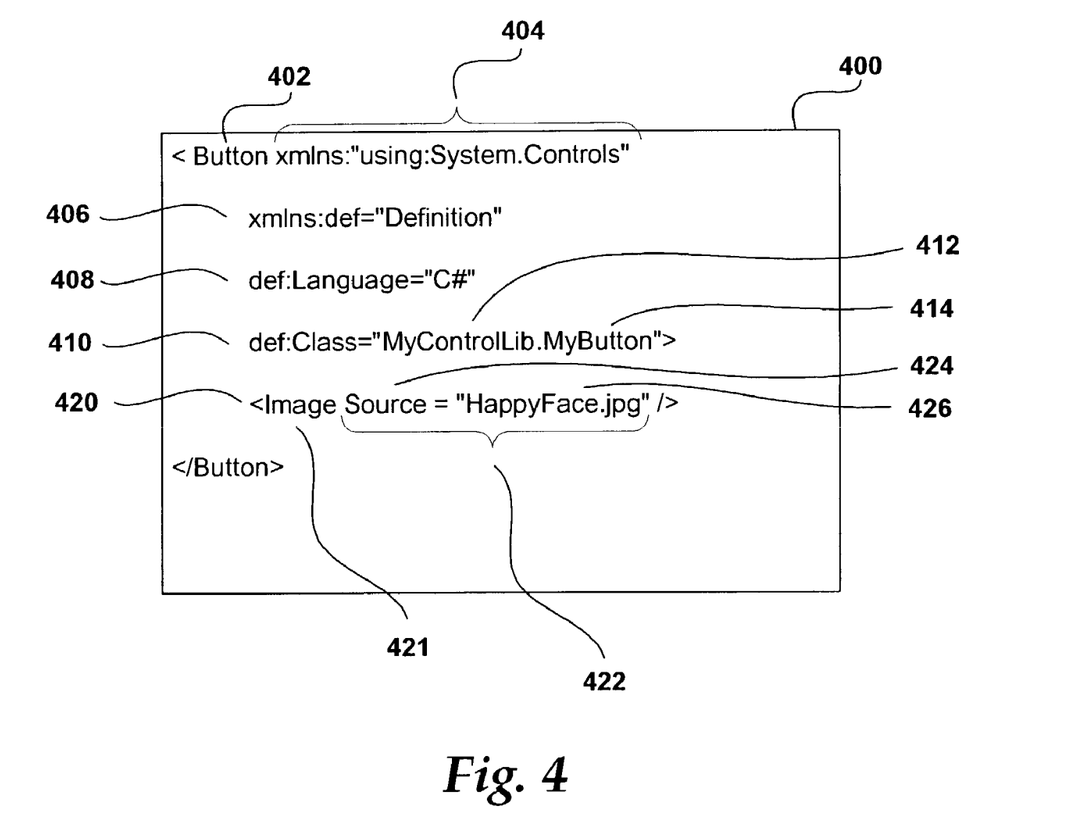
FIGS. 4-6 illustrate a series of salient portions of markup documents that illustrate an exemplary syntax for declaratively defining subclasses in accordance with one embodiment of the present invention.
Figure 5:
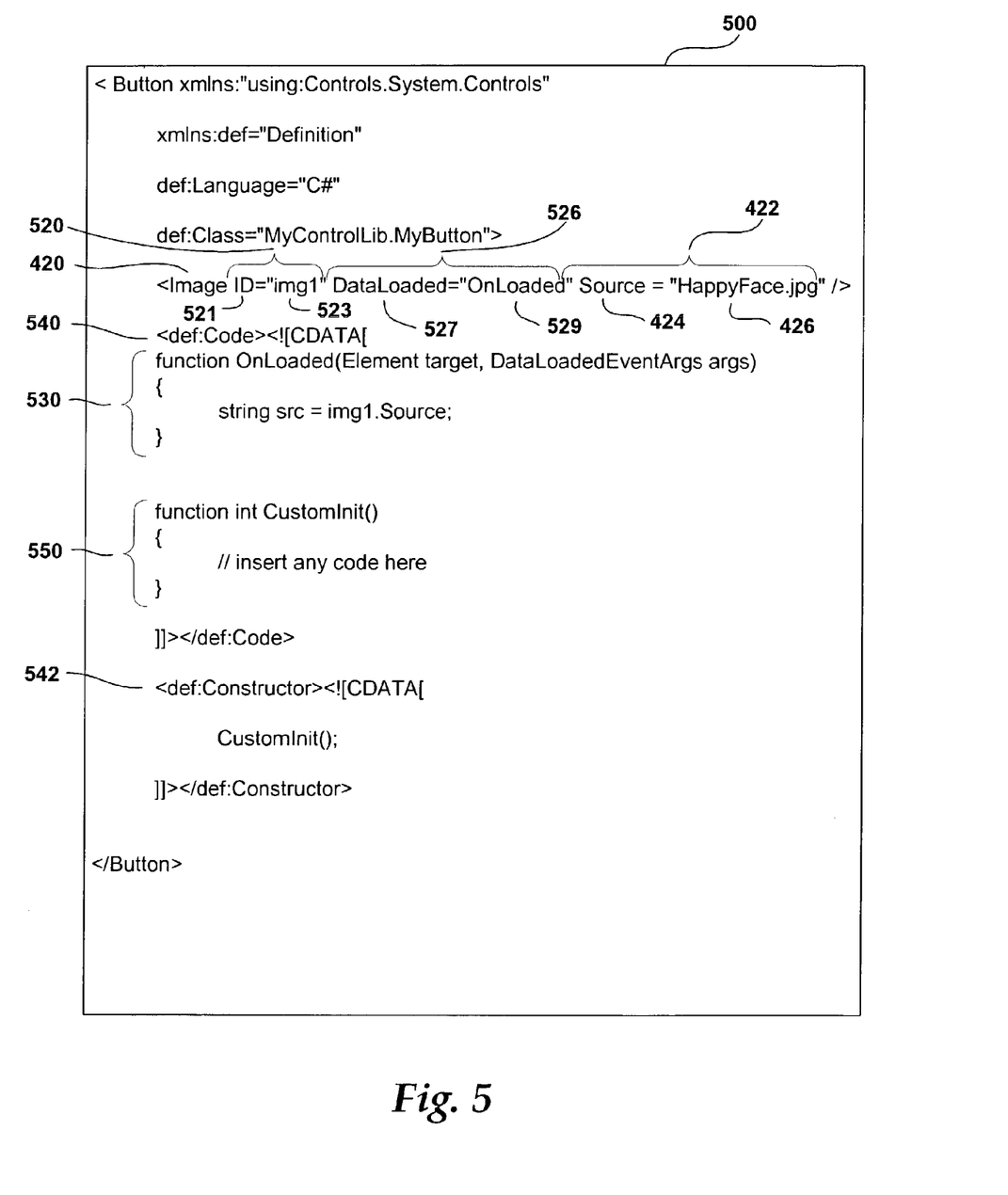
Figure 6:
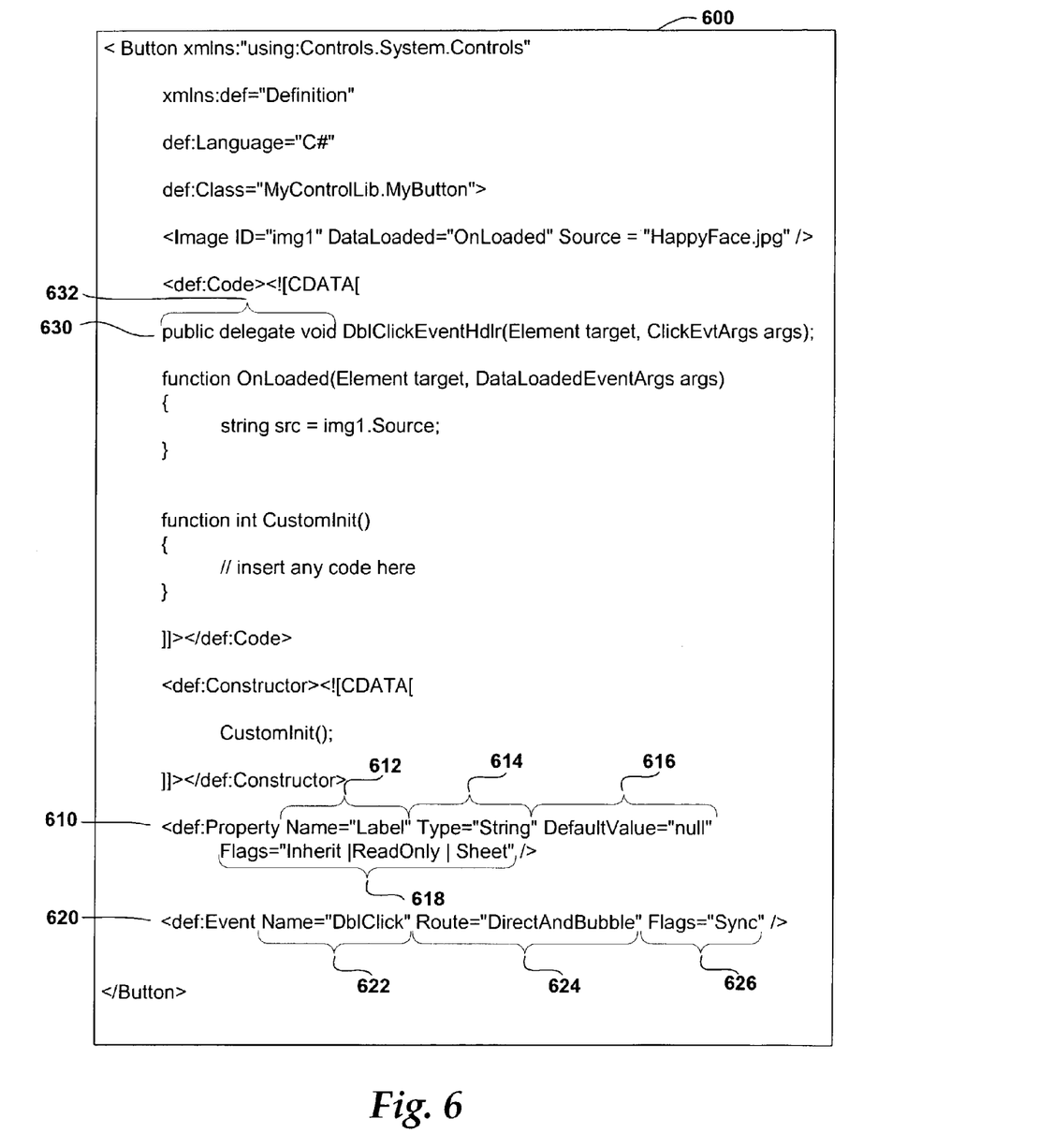
Figure 10:
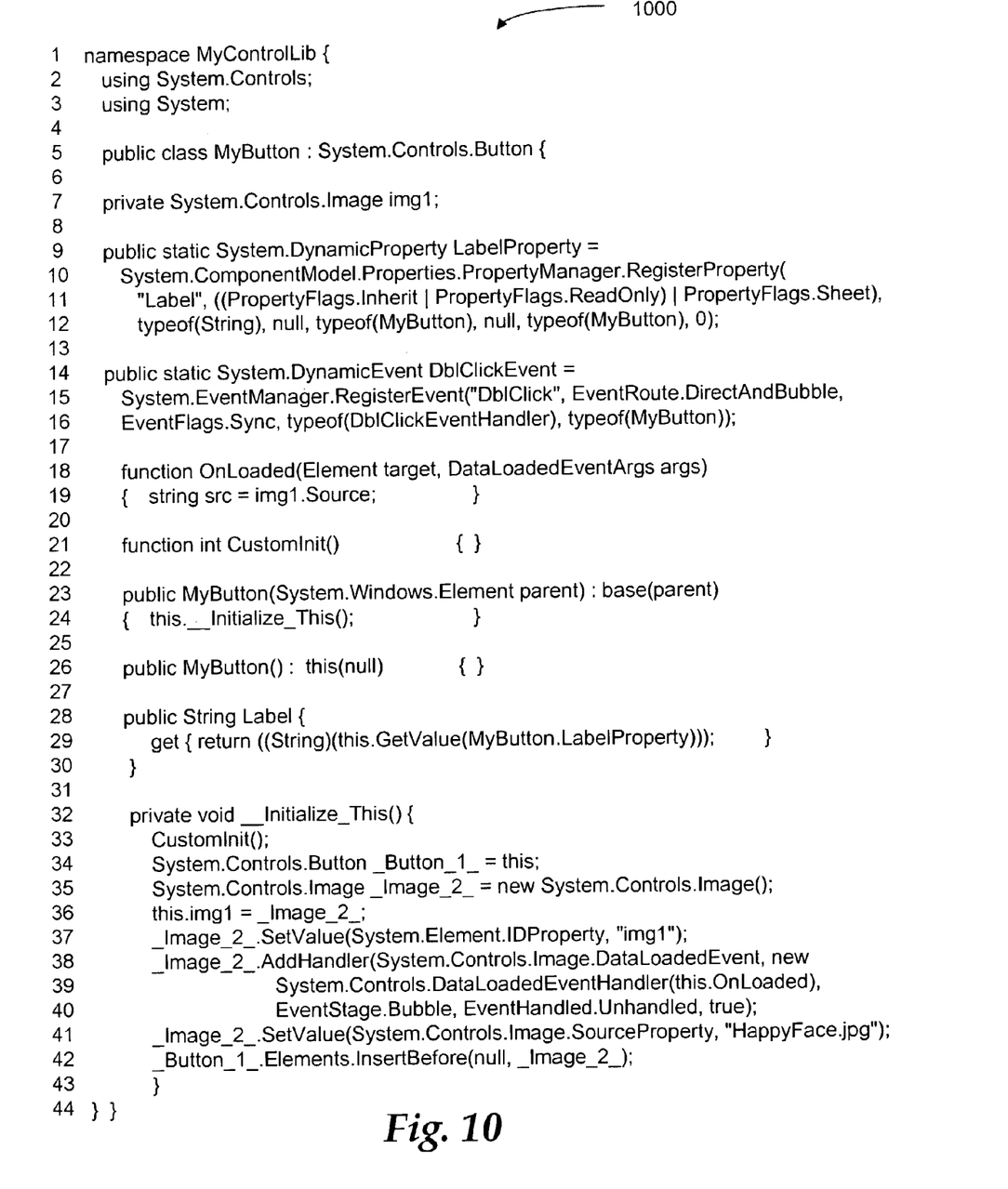
FIG. 10 is an exemplary source code listing of representative source code generated by the markup compiler shown in FIG. 2 based on markup documents illustrated in FIGS. 4-6.

FIGS. 4–6 illustrate a series of salient portions of markup within markup document 206 that illustrate an exemplary syntax for declaratively defining subclasses in accordance with one embodiment of the present invention. FIG. 10 is an exemplary source code listing illustrating representative source code that the markup compiler 202 may generate based on the salient portions of markup shown in FIGS. 4-6. In one embodiment, the markup compiler 202 may actually generate a file containing the representative source code. This may occur when a developer has set a debug flag. The file containing the representative source code then allows the developer to determine possible problems within the text in the markup document 206 or problems within the markup compiler 202. In another embodiment, the representative code may not be saved within a file. For this embodiment, the markup compiler 202 may generate the tokenized binary file 208 and the IL assemblies 210 with or without first generating the representative source code.

In overview, the series of FIGS. 4-6 incrementally describe various aspects for defining a subclass declaratively within markup in accordance with the present invention. FIG. 4 illustrates an exemplary syntax for defining a subclass and a subclass hierarchy. FIG. 5 illustrates an exemplary syntax for defining identifiers, code, and constructors for the subclass. FIG. 6 illustrates an exemplary syntax for defining properties and events for the subclass. Each of these figures will now be described in detail.

FIG. 4 illustrates an exemplary syntax for defining a subclass and a subclass hierarchy. The salient portion of markup 400 (i.e., subclass definition) includes a superclass tag 402 (e.g., "Button"). For the following discussion, each tag (e.g., superclass tag 402) has a corresponding end tag. For convenience, the end tag is not explicitly referred to in the written description, but is illustrated in the associated figures. Markup 400 includes a namespace attribute 404, a definition namespace declaration 406, and several compiler hints (e.g., hint 408 and 410). Namespace attribute 404 identifies the namespace (e.g., "System.Control") and assembly in which the superclass (e.g., Button) is located. The definition namespace declaration 406 indicates that any attribute within markup 400 that contains "def:" prefix represents a hint to the compiler regarding actions that the compiler needs to take.

For example, hint 408 (hereinafter referred to as language hint 408) indicates to the compiler to generate the IL assembly using the language (e.g., C#) assigned to the language hint 408. The language hint 408 may have any one of a various number of programming languages assigned, such as C, C++, and the like. Hint 410 (hereinafter referred to as def:Class hint 410) indicates to the compiler to define the subclass using a name 414 (e.g., MyButton) assigned to the def:Class hint 410. The def:Class hint 410 may also include a subclass namespace 412 that identifies the namespace (e.g., "MyControlLib") in which the new subclass should be associated. Thus, in FIG. 4, a developer has declaratively defined a new subclass named "MyButton" that extends the "Button" class located in the "System.Controls" namespace. The new subclass will be associated with the "MyControlLib" namespace.

In the markup 400 illustrated in FIG. 4, an element declaration tag 420 (e.g., "Image") is defined. Because a specific namespace is not defined within the element declaration tag 420, the namespace attribute 404 also defines the location for the element (e.g., "Image") associated with the element declaration tag 420. The element declaration tag 420 includes an element 421 and a source attribute 422. Source attribute 422 includes a property 424 (e.g., "Source") and a value 426 (e.g. "HappyFace.jpg"). Because element declaration tag 420 is within the subclass definition for the subclass defined as "MyButton", the elements associated with the element declaration tag 420 will be instantiated when the subclass is instantiated. In addition, the elements associated with the element declaration tag 420 are contained within a children collection of the new subclass. In other words, the subclass is the parent to the elements associated with element declaration tags 420. Thus, one skilled in the art will appreciate that the markup 400 allows developers to express hierarchy in a manner that allows the compiler to generate element trees that are rooted to the subclass being defined (e.g., "MyButton").

FIG. 5 illustrates an exemplary syntax for defining identifiers, code, and constructors for the subclass. The salient portion of markup 500 includes markup 400 described above in addition to markup for defining the identifiers, code, and constructors. For readability, the reference numerals illustrated in FIG. 4 and described above are not shown in FIG. 5 unless helpful in describing these new aspects. In FIG. 5, element declaration tag 420 further includes attributes, such as id attribute 520 and event attribute 526. Id attribute 520 includes id property 521 (e.g., "ID") and id value 523 (e.g., "img1"). Id attribute 520 illustrates an exemplary mechanism for defining identifiers for the subclass in accordance with the present invention.

The event attribute 526 includes an event trigger 527 (e.g., "DataLoaded") and an event value 529 (e.g., "OnLoaded"). The event trigger 527 specifies the event that is monitored and the event value 529 specifies the method that is executed when the event trigger 527 occurs. The event value 529 is associated with a method 530 (e.g., "OnLoaded" function). The method 530 may be written using a programming language. Method 530 may reference instances of a class and subclasses defined within markup 500. When method 530 is written using a programming language within a markup document, method 530 is associated with a code hint 540. The code hint 540 allows developers to add code snippets to the body of the subclass definition. In one embodiment, the code follows the code hint 540 and is a callable method or event handler. In markup 500, for example, OnLoaded function 530 serves as the event handler for the DataLoaded event that is raised by the Image control. Other code snippets may also be added to the body of the subclass definition, such as CustomInit function 550 shown in FIG. 5.

Markup 500 also includes a constructor hint 542. The constructor hint 542 allows the developer to write a supplemental constructor that supplements the default constructor that is created for a subclass. In one embodiment the supplemental constructor is the last behavior executed by the generated default constructor. The supplemental constructor may contain code that affects the behavior of the subclass at construction time. The developer may call the constructor of the superclass within the supplemental constructor. The supplemental constructor shown in FIG. 5 calls CustomInit function 550, which is a user-defined private method.

FIG. 6 illustrates an exemplary syntax for defining properties and events for the subclass. The salient portion of markup 600 includes markup 400 and markup 500 described above in addition to markup for defining properties and events. For readability, the reference numerals illustrated in FIGS. 4-5 and described above are not shown in FIG. 6 unless helpful in describing these new aspects.

Markup 600 includes property hint 610 that allows properties to be defined on the subclass. The property acts as a member variable of the subclass. The property hint 610 may include one or more attributes, such as name attribute 612, type attribute 614, default values attribute 616, and flag attribute 618. The name attribute 612 specifies a name for the property. In one embodiment, names are case sensitive and the runtime engine places no restrictions on the characters that are used for the name. The name must be unique to the owner who registers the name. The type attribute 614 specifies a type for the value of the property. The type includes intrinsic, user-defined, struct, class, interface, enum, and the like. The default values attribute 616 specifies a value that is assigned when the property is instantiated. The flag attribute 618 specifies the type of methods that are created by the wrapper when the property is instantiated. The flags may have the ability to control characteristics of the property, such as ReadOnly, Inheritable to child elements, Private, and the like.

Markup 600 also includes event hint 620. The event hint 620 allows events to be defined on the subclass. The event hint 620 may include attributes, such as name attribute 622, route attribute 624, flags attribute 626, and the like. Name attribute 622 specifies the string that refers to this event. When an xml file uses the subclass, the xml file uses this string to attach the appropriate application developer defined code. Route attribute 624 specifies the method, which determines the elements in the tree to raise the event on. Flags attribute 626 specifies other characteristics associated with the event. For example, for markup 600, the markup compiler will generate code to enable an eventcalled DblClick and include information associated with the event, such as routing supported, flags, and the like. One skilled in the art will appreciate that the names and values associated with the attributes may be modified without departing from the scope of the present invention.

Markup 600 also includes an event handler declaration 630. Event handler declaration 630 may have associated event handler modifiers 632, such as public/private, delegate, return type, and the like. In FIG. 6, event handler declaration 630 declares an event handler (i.e, method)(e.g., "DblClickEventHandler") that is called when the associated event occurs.

Other tags may be defined within markup documents too. For example, a root tag (e.g., "def:Library") may be used to inform the compiler and/or parser to define the subclass in a separate file, to define the subclass with other subclasses in one file, and the like. A namespace may be declared for a custom Element, for all classes defined within the root tag, and the like.

FIG. 7 illustrates a salient portion of a markup document that illustrates an exemplary syntax for using a subclass from within a markup document. Markup 700 includes a root element 702 (e.g., FlowPanel element), a default namespace declaration 704, a definition namespace prefix 706, and an element 708. One will appreciate that element 708 may reference a custom component that was built using the syntax specified above. The default namespace declaration 704 specifies a default namespace for tags without prefixes. In the illustrative markup 700, the default namespace declaration 704 refers to "System.Controls" namespace. The defintion namespace prefix 706 specifies a location in which the custom component or element may be found. In the illustrative markup 700, the definition namespace prefix 706 refers to "MyControlLib". The element 708 includes a class name 710 (e.g., "MyControlLib"), an identifier 712, and a text string 714. The class name 710 refers to the class that is instantiated for this element. The identifier 712 refers to the element and includes a name (e.g., "ID") and value (e.g., "button1"). The value becomes the name of the instance of the class name 710 during runtime (e.g., button1).

Generalized Operation of the Illustrative Implementation

Figure 8:
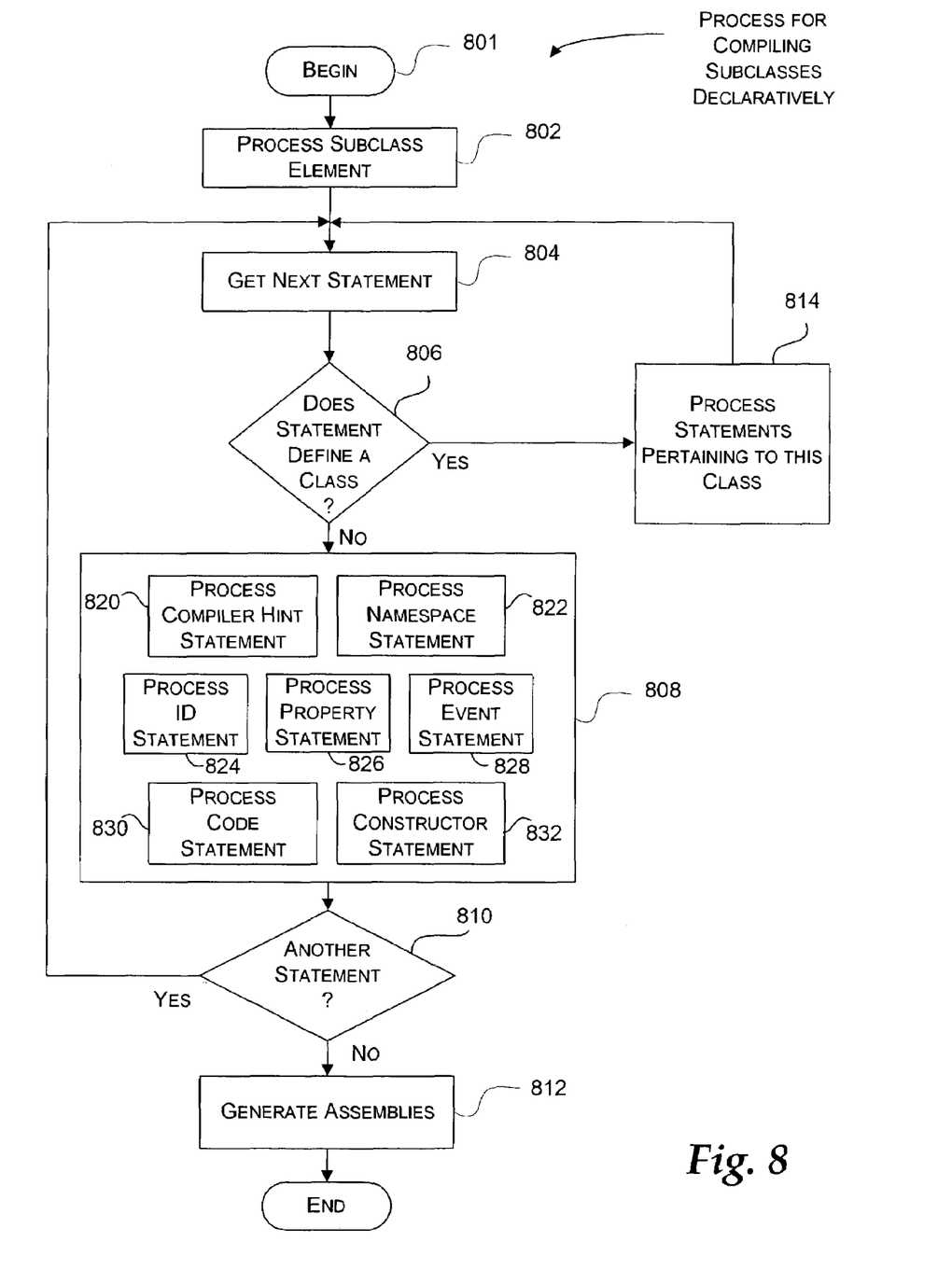
FIG. 8 is a logical flow diagram generally illustrating a process for compiling declaratively defined subclasses in accordance with one embodiment of the present invention.

FIG. 8 is a logical flow diagram generally illustrating a process 800 for compiling declaratively defined subclasses in accordance with one embodiment of the present invention. The exemplary markup shown in FIGS. 4-6, along with the representative source code in FIG. 10, is used in conjunction with FIG. 8 to describe process 800. As one can readily recognize, after comparing FIG. 10 with markup 600, the present invention allows sophisticated subclasses to be generated declaratively without requiring the developer to understand the underlying programming language. The representative code in FIG. 10 is C# source code. However, the markup compiler, in accordance with the present invention, may generate representative code using the syntax of any programming language.

The process 800 begins at block 801, where a markup compiler is compiling a markup document and encounters markup having a subclass definition. The markup compiler may determine that it has encountered a subclass definition by any mechanism, such as not recognizing the markup as any other format, recognizing a subclass tag (e.g., def: Class), and the like. For example, in markup 400, the markup compiler may process several statements before encountering the subclass tag (e.g., def:Class hint 410) that identifies the subclass definition. In other embodiments, the subclass tag may be encountered before other statements, such as when the subclass does not specify a base class (e.g., button). In general, the subclass tag may appear anywhere that an element tag can appear within markup. Once markup is identified as having a subclass definition, processing continues at block 802.

At block 802, the subclass tag is processed. As described with reference to FIG. 4, the subclass tag (also referred to as the def:Class hint 410) is assigned a name 414, which may also include a subclass namespace 412. Based on this information, representative code, such as line 1 in FIG. 10, may be generated for the assembly. In addition, a class having the assigned name is generated, such as shown on line 5 in FIG. 10. Line 5 will be augmented with other generated code once additional statements (e.g., namespace and superclass) have been processed. As part of processing the subclass tag, the process identifies whether the subclass extends from any class (i.e., a superclass) and obtains information associated with the superclass. In FIG. 4, the subclass being created "MyButton" extends from "Button" as defined by the superclass tag 402. Thus, line 5 in FIG. 10 includes representative code that extends MyButton from Button as shown.

In addition, a default constructor for the subclass is generated. Again, upon processing additional statements, this default constructor may be augmented with additional representative code. Lines 23-24 and 26 in FIG. 10 correspond to the representative code that is generated. However, "this._Initialize_This( )" is code that is added after processing another statement as will be described below. Once the subclass tag is processed, processing continues to block 804.

At block 804, the next statement in the markup is retrieved. The next statement may be the statement before or may be the statement after the subclass tag statement depending on the location of the subclass tag statement within the subclass definition. Once the next statement is retrieved, processing continues to decision block 806.

At decision block 806, a determination is made whether the statement defines a class. As mentioned above, the present invention allows hierarchy to be expressed declaratively. In one embodiment, a statement defining another class (i.e., element) that is a child to the subclass will occur after the subclass tag statement. For the moment, assuming that the current statement does not define a class, processing continues to block 808.

At block 808, the statement is processed. There are various types of statements that may occur within the subclass definition. These statements may occur in various orders. The processing involved for each type of statement will be described below in detail. However, in general, each statement that is processed will result in the generation of additional representative code for the subclass definition. Once one of the statements has been processed in block 808, processing continues to decision block 810.

At decision block 810, a determination is made whether any statements remain to be processed for the subclass definition. If there is another statement, processing loops back through blocks 804-808 and processes that statement. Once all the statements within the subclass definition have been processed, the process continues from decision block 810 to block 812.

At block 812, the representative code that has been generated during the above process is used to generate the IL assemblies for the subclass definition. The developer may have specified in one of the compiler hint statements (block 820) the programmatic language to use when generating the representative code, may have specified which assembly file to store the subclass definition, and the like. Once the IL assembly or IL assemblies have been generated, processing is complete. As mentioned above, the above created assembly is now available to be executed using traditional programming languages, using markup statements in accordance with the present invention, and the like. The assembly appears as if written using a programmatic language.

Returning to decision block 806, if the statement begins a definition for a new class (i.e., element), processing continues at block 814. At block 814, the statements pertaining to this new class are processed using processing within block 808 for each statement until all the statements pertaining to the new class have been processed. For example, in FIG. 5, statements 520, 526, 422 are processed for the new class "Image". Image is then a child of the subclass "MyButton". Processing continues at block 804 to continue processing statements associated with the subclass.

Now, returning to block 808, the processing for each individual type of statement (blocks 820-832) that may occur within the subclass definition is described. At block 820, statements that are compiler hints are processed. In general, the statements that are compiler hints provide information to the markup compiler as to how the assembly should be generated. For example, in FIG. 4, language hint 408 is a compiler hint statement that informs the markup compiler the programming language to use when generating the representative code. In FIG. 4, the language hint 408 is assigned C#, thus, the representative code illustrated in FIG. 10 is C# source code.

At block 822, statements that define namespaces are processed. These namespaces are then included in the representative code, such as shown on lines 2 and 3 in FIG. 10.

At block 824, statements that define an identifier (id) for a class are processed. For any id attributes within the markup document, the markup compiler generates a field member for the associated class. The field member is generated having a type that is the same as the class for which the id attribute is defined. The name of the field member is the id value assigned to the id attribute. For example, in FIG. 5, when processing the statements pertaining to the Image class, an id attribute 520 is encountered. Thus, as shown on line 7 in FIG. 10, the markup compiler will generate representative code for the MyButton class that has a field member defined as:

private System.Controls.Image img1;.

During runtime, the field member is initialized to an instance of the corresponding type (e.g., Image) that is created in the InitComponent( ) method. As a result, any code in the MyButton class may access any other element instance in its hierarchy simply by the id value for the class. Initializing the field member is shown on line 37 in FIG. 10.

At block 826, statements that define a property for a class are processed. For any properties defined within the markup document, the markup compiler generates representative source code for the property and registers the property if needed. For example, in FIG. 6, markup 600 includes a property hint 610 that has various attributes 612-618. The property hint 610 will inform the markup compiler that the statements following the property hint 610 are for a property. The attributes 612-618 are then read in as property statements. The markup compiler will generate representative code for the "Label" property to register the property for the MyButton class as shown on lines 9-12 in FIG. 10. The markup compiler will also generate representative code to define the property as shown on lines 28-30 in FIG. 10. Lines 28-30 illustrate how the name attribute 612 becomes the name of the property in the representative code and the type attribute 614 becomes the type for the property in the representative code.

In one embodiment, the process generates code for the values of the property by calling the TypeConverter for the type of the property, which executes code at runtime using reflection and converting the string to an actual object instance of the property type. In another embodiment, process 800 calls the type converter for the property in order to get the actual object value and converts the value to an InstanceDescriptor object. The InstanceDescriptor object contains sufficient information so that the markup compiler can reflect on the object to generate representative code that creates a new instance of the value's type as specified in the attributes associated with the property hint. Lines 28-30 in FIG. 19 illustrate how the labelProperty will be set on an instance of MyButton during runtime with the assigned value of the Label property. The assigned value may be assigned declaratively in markup (as shown in FIG. 7) or assigned programmatically using any programming language.

At block 828, statements that define an event for a class are processed. For event statements, the markup compiler generates representative code for the event. Events may be defined in markup using various mechanisms, such as an event attribute 526 shown in FIG. 5 and as an event hint 620 shown in FIG. 6. First, the mechanism using the event attribute is described. The event attribute includes the event trigger and the event value. The event trigger corresponds to the event and the event value corresponds to the method that gets executed when the event trigger occurs. Referring to FIG. 5, the event value 529 ("OnLoaded") is added as an event handler on lines 38-40 of the representative code in FIG. 10 by defining "this.OnLoaded" as the new System-.Controls.DataLoadedEventHandler. The event trigger 527 ("DataLoaded") is added as the event on line 38 of the representative code in FIG. 10 by defining the first parameter of AddHandler as System.Controls.Image.DataLoadedEvent. The other parameter for the AddHandler may use default values or may be specified in the markup document.

The mechanism using the event hint 620 is now described. The event hint 620 includes an event name attribute and other attributes. The name assigned to the event name attribute is registered as the event. For example, referring to FIG. 6, "DblClick" is the name assigned to the event name attribute. Thus, "DblClick" is the first parameter of the RegisterEvent method that is generated on lines 14-16 in FIG. 10. The type of the event handler declaration 630 for the method "DblClickEventHdlr" is also included as a parameter of the RegisterEvent method in FIG. 10. Again, the other parameters to the RegisterEvent method may use default values or may be specified in the markup document using other attributes. During runtime, in accordance with one embodiment, the event is hooked up using reflection to identify the type of DblClickEventHandler and to locate the method. In another embodiment, the event is hooked up in a manner such that reflection is unnecessary, as described in the commonly assigned co-pending application entitled "System and Method for Creating a Runtime Connection Interface for Attributes and Element Tags Defined within a Page Subclass in a Markup Document", patent application Ser. No. 10/377,196, filed on Feb. 28, 2003, which is hereby incorporated by reference.

At block 830, statements that define code are processed. Statements that define code follow a compiler hint statement (block 820), such as code hint. These statements are written in a programming language and will appear as is in the representative code. For example, FIG. 5 illustrates method 530 and CustomInit Function 550. Method 530 and CustomInit Function 550 appear on lines 18-19 and 21, respectively, in FIG. 10.

At block 832, statements that define a supplemental constructor are processed. Again, statements that define a supplemental constructor follow a compiler hint statement (block 820), such as constructor hint. The markup compiler generates a supplemental constructor ("this._Initialize_This( )" in FIG. 10) and adds the statements within the supplemental constructor. For example, in FIG. 5, the statement after the constructor hint 542 calls "CustomInit( )". Thus, in FIG. 10 on line 33, the markup compiler adds "CustomInit( )" to the supplemental constructor in the representative source code.

Those skilled in the art will appreciate that block 812 may be performed incrementally while processing blocks 804-810 without departing from the present invention. In addition, depending on the functional implementation of parser 204 and markup compiler 202, there may be callbacks between parser 204 and markup compiler 202 during process 800.

Figure 9:
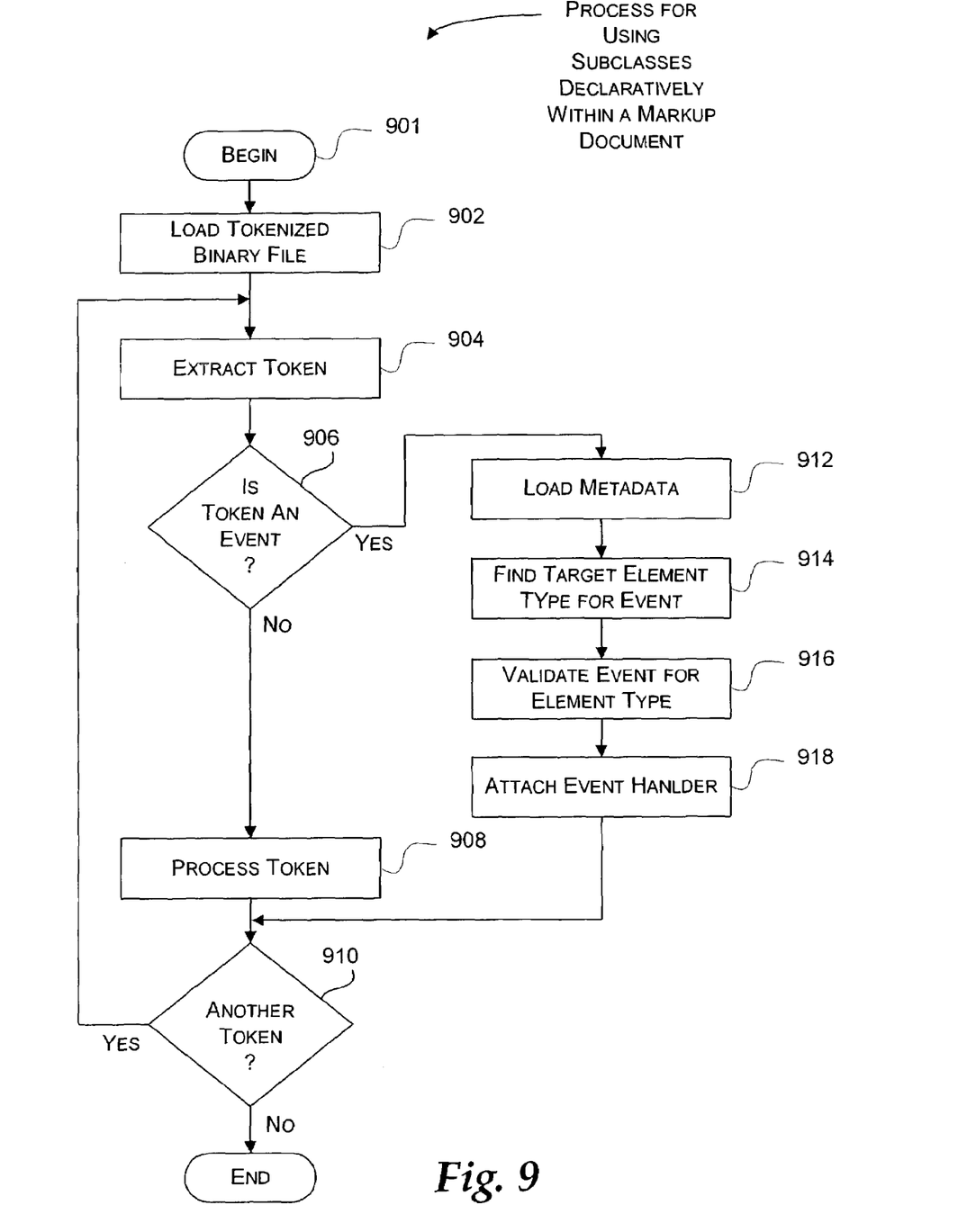
FIG. 9 is a logical flow diagram generally illustrating a runtime process for using subclasses declared from within a markup document in accordance with one embodiment of the present invention.

FIG. 9 is a logical flow diagram generally illustrating a runtime process 900 for using a subclass declared from within a markup document in accordance with one embodiment of the present invention. The exemplary markup shown in FIG. 7 is used in conjunction with FIG. 9 to describe the process 900. The process 900 begins at block 901, where a runtime engine receives a request for a particular resource (e.g., markup document) and determines that a compiled version exists for the particular resource. For example, in FIG. 7, assuming markup 700 has not been previously compiled into an tokenized binary file, when the markup compiler encounters the element 708, the markup compiler will determine that the MyButton class has an associated tokenized binary file and IL assembly. This associated tokenized binary file that includes the tokenized attributes for the MyButton class will then be processed using process 900. The associated tokenized binary file and IL assembly may have been generated using the present invention. Processing continues at block 902.

At block 902, the tokenized binary file is loaded. The tokenized binary file may be loaded incrementally or in its entirety. The tokenized binary file may identify IL assemblies associated with the tokenized binary file that need to be loaded. With reference to FIG. 7, for example, the IL assemblies associated with the MyButton class are loaded. Processing continues at block 904.

At block 904, a token is retrieved from the tokenized binary file. As mentioned above, in the new runtime environment, the tokenized binary file that is generated is independent from the programming language that was used to generate the tokenized binary file. Thus, the runtime engine may process the tokenized binary file without regard to the programming language that was originally used to create the tokenized binary file. Processing continues at decision block 906.

At decision block 906, a determination is made whether the token that was retrieved is an event. If the token is not an event, processing continues at block 908.

At block 908, the token is processed. As mentioned above, the processing of the token does not depend on the manner in which the tokenized binary file is generated. In other words, token processing a token in an tokenized binary file that was created declaratively from within a markup document or using a programming language will proceed in the same manner. Therefore, because the processing of tokens within a tokenized binary file is known to those skilled in the art, the processing of the token need not be discussed at length here. Processing continues at decision block 910.

At decision block 910, a determination is made whether there are any more tokens in the tokenized binary file. If there are more tokens, processing loops back to block 904 and proceeds as described above. On the other hand, if there are no more tokens, processing is complete and continues to the end block.

Returning to decision block 906, if the token is an event, processing continues at block 912. At block 912, metadata associated with the tokenized binary file is loaded. The metadata includes descriptions for types, resources, methods, and the like. Processing continues at block 914.

At block 914, using the metadata and reflection, the process finds a target element type for the event. This involves accessing the metadata and going through each field to determine the type. Processing continues at block 916.

At block 916, the event is validated for the target element type. This insures that the event is a valid event. If the event is not a valid event for the target element type, an error results. Processing continues at block 918.

At block 918, reflection is used on the target element type to obtain the event method, which is then executed. Execution of the event method involves executing code within the associated IL assembly. Thus, referring to FIG. 7, once the MyButton becomes instantiated and the event is found, the event method ("DblClickEvent") is attached. This attaches an event handler (e.g., DblClickEventHandler) to the event (e.g. DblClick). Processing continues at decision block 910 and proceeds as described above.

Thus, as described, the present invention provides a mechanism for defining subclasses declaratively within a markup document and for using subclasses from within a markup document. This allows developers to focus more on ways to use the components instead of worrying about how to implement the components in any one programming language.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-readable medium having a tangible component encoded with a computer-readable data structure, the data structure comprising:

a schema for declaratively defining a subclass definition within a markup document, the schema is capable of being compiled into an executable assembly that instantiates an object associated with a subclass defined within the subclass definition upon execution of the assembly, wherein the executable assembly is independent from a programming language originally used to create the assembly such that the executable assembly is compiled without regard to the programming language.

2. The computer-readable medium of claim 1, wherein the schema is an extensible markup language (XML)—based schema.

3. The computer-readable medium of claim 1, wherein the schema includes a subclass tag for defining a name, the name being associated with a type of the object that becomes instantiated.

4. The computer-readable medium of claim 1, wherein the schema includes a language indicator for specifying a programming language to use when compiling the subclass definition.

5. The computer-readable medium of claim 4, wherein the schema further includes a code indicator for delineating code within the markup document, the code being directly compiled into the executable assembly.

6. The computer-readable medium of claim 5, wherein the code is directly compiled based on a syntax of the programming language specified in the language indicator.

7. The computer-readable medium of claim 1, wherein the schema includes a superclass tag for specifying a superclass from which the subclass is derived.

8. The computer-readable medium of claim 7, wherein the schema includes a superclass namespace attribute for specifying a namespace in which the superclass resides.

9. The computer-readable medium of claim 1, wherein the schema includes a subclass tag for specifying the subclass.

10. The computer-readable medium of claim 1, wherein the schema includes a constructor indicator for specifying one or more supplemental actions to perform when instantiating the object.

11. The computer-readable medium of claim 1, wherein the schema includes an event indicator for specifying an event and a corresponding event handler that becomes associated with the object when instantiated.

12. The computer-readable medium of claim 1, wherein the schema includes a property indicator for specifying a property, the property becoming a member within the object when the object is instantiated.

13. The computer-readable medium of claim 1, wherein the schema includes an element declaration for specifying a child element of the subclass.

14. A computer-readable medium having a tangible component that comprises instructions for creating an executable assembly for a subclass, the instructions comprising:

identifying a subclass definition within a markup document, the subclass definition defining a subclass; and generating an assembly based on the subclass definition, the assembly being executable to create an instance of an object associated with the subclass, wherein the generated assembly is independent from a programming language originally used to create the assembly such that the generated assembly is executed without regard to the programming language.

15. The computer-readable medium of claim 14, wherein identifying the subclass definition includes parsing a subclass tag, the subclass tag including a subclass name attribute for defining a name, the name being associated with a type of the object that becomes instantiated.

16. The computer-readable medium of claim 14, wherein generating an assembly based on the subclass definition includes compiling the subclass definition into representative source code that is compiled into the assembly.

17. The computer-readable medium of claim 16, wherein the representative source code is based on a programmatic language.

18. The computer-readable medium of claim 14, wherein generating an assembly based on the subclass definition includes compiling code within the subclass definition into the assembly, the code being delineated within the subclass definition by a code indicator.

19. The computer-readable medium of claim 14, wherein generating an assembly based on the subclass definition includes parsing a superclass tag that defines a superclass from which the subclass is derived, specifying the inheritance using a syntax associated with a programmatic language, and compiling the syntax to become a part of the assembly.

20. The computer-readable medium of claim 14, wherein generating an assembly based on the subclass definition includes parsing a constructor indicator that defines at least one supplemental action that is performed when the object is instantiated, the supplemental action being a part of the assembly.

21. The computer-readable medium of claim 14, wherein generating an assembly based on the subclass definition includes parsing an event indicator that creates an event definition and a corresponding event handler for the subclass.

22. The computer-readable medium of claim 14, wherein generating an assembly based on the subclass definition includes parsing a property indicator that defines a property that becomes a member within the object when the object is instantiated.

23. The computer-readable medium of claim 14, wherein generating an assembly based on the subclass definition includes parsing an element declaration tag that identifies a child element of the subclass.

24. A method for generating an executable assembly, the method being implemented at least in part by a computing device, the method comprising:
   identifying a subclass definition within a markup document, the subclass definition defining a subclass; and
   generating an assembly based on the subclass definition, the assembly being executable to create an instance of an object associated with the subclass, wherein the generated assembly is independent from a programming language originally used to create the assembly such that the generated assembly is executed without regard to the programming language.

25. The method of claim 24, wherein identifying the subclass definition includes parsing a subclass tag, the subclass tag including a subclass name attribute for defining a name, the name being associated with a type of the object that becomes instantiated.

26. The method of claim 24, wherein generating an assembly based on the subclass definition includes parsing a superclass tag that defines a superclass from which the subclass is derived, specifying the inheritance using a syntax based on a programmatic language, and compiling the syntax to become a part of the assembly.

27. The method of claim 24, wherein generating an assembly based on the subclass definition includes parsing a constructor indicator that defines at least one supplemental action that is performed when the object is instantiated, the supplemental action being a part of the assembly.

28. The method of claim 24, wherein generating an assembly based on the subclass definition includes parsing an event indicator that creates an event definition and a corresponding event handler for the subclass.

29. The method of claim 24, wherein generating an assembly based on the subclass definition includes parsing a property indicator that defines a property that becomes a member within the object when the object is instantiated.

30. A computer-readable medium having a tangible component comprising instructions for creating an executable assembly for a subclass, the instructions comprising the method of claim 24.

31. A computer system for generating an assembly from a subclass definition with a markup document, the computer system comprising:
   a processor; and
   a memory, the memory being allocated for a plurality of computer-executable instructions which are loaded into the memory,
   wherein the processor executes the instructions to:
   identify a subclass definition within a markup document, the subclass definition defining a subclass; and
   generate an assembly based on the subclass definition, the assembly being executable to create an instance of an object associated with the subclass, wherein the generated assembly is independent from a programming language originally used to create the assembly such that the generated assembly is executed without regard to the programming language.

32. The computer system of claim 31, wherein identifying the subclass definition includes parsing a subclass tag, the subclass tag including a subclass name attribute for defining a name, the name being associated with a type of the object that becomes instantiated.

33. The computer system of claim 31, wherein generating an assembly based on the subclass definition includes parsing a constructor indicator that defines at least one supplemental action that is performed when the object is instantiated, the supplemental action being a part of the assembly.

34. The computer system of claim 31, wherein generating an assembly based on the subclass definition includes parsing an event indicator that creates an event definition and a corresponding event handler for the subclass.

35. The computer system of claim 31, wherein generating an assembly based on the subclass definition includes parsing a property indicator that defines a property that becomes a member within the object when the object is instantiated.

36. A system for generating an executable assembly, the method comprising:
   a means for identifying a subclass definition within a markup document, the subclass definition defining a subclass; and
   a means for generating an assembly based on the subclass definition, the assembly being executable to create an instance of an object associated with the subclass, wherein the generated assembly is independent from a programming language originally used to create the assembly such that the generated assembly is executed without regard to the programming language.

37. The system of claim 36, wherein the means for identifying the subclass definition includes a means for parsing a subclass tag, the subclass tag including a subclass name attribute for defining a name, the name being associated with a type of the object that becomes instantiated.

38. The system of claim 36, wherein the means for generating an assembly based on the subclass definition includes a means for parsing a superclass tag that defines a superclass from which the subclass is derived, a means for specifying the inheritance using a syntax based on a programmatic language, and a means for compiling the syntax to become a part of the assembly.

39. The system of claim 36, wherein the means for generating an assembly based on the subclass definition includes a means for parsing a constructor indicator that defines at least one supplemental action that is performed when the object is instantiated, the supplemental action being a part of the assembly.

* * * * *